(12) United States Patent
Namaky (10) Patent No.: US 6,816,760 B1
(45) Date of Patent: Nov. 9, 2004

(54) ENCLOSURE WITH INTERFACE DEVICE FOR FACILITATING COMMUNICATIONS BETWEEN AN ELECTRONIC DEVICE AND A VEHICLE DIAGNOSTIC SYSTEM

(75) Inventor: Hamid Namaky, South Russell, OH (US)

(73) Assignee: Actron Manufacturing Company, Cleveland, OH (US)

( * ) Notice: Subject to any disclaimer, the term of this patent is extended or adjusted under 35 U.S.C. 154(b) by 0 days.

(21) Appl. No.: 10/437,152

(22) Filed: May 13, 2003

(51) Int. Cl.[7] ................................................ G06F 7/00

(52) U.S. Cl. ........................................................ 701/29

(58) Field of Search .......................................... 701/29

(56) References Cited

U.S. PATENT DOCUMENTS 5,555,498 A * 9/1996 Berra et al. ................... 701/33

* cited by examiner

Primary Examiner—Yonel Beaulieu
(74) Attorney, Agent, or Firm—Calfee, Halter & Griswold LLP (57) ABSTRACT

The present invention is protective enclosure that is configured to receive an electronic device, such as a pocket PC or a PDA. The protective enclosure includes an interface device capable of coupling with the electronic device and a vehicle diagnostic system, thereby placing the electronic device in circuit communication with a vehicle diagnostic system. A communications protocol is generated by the interface device to establish communications with the vehicle diagnostic system. The vehicle diagnostic information is received and the interface adapter is capable of communicating the diagnostic information to the electronic device.

52 Claims, 10 Drawing Sheets

ENCLOSURE WITH INTERFACE DEVICE FOR FACILITATING COMMUNICATIONS BETWEEN AN ELECTRONIC DEVICE AND A VEHICLE DIAGNOSTIC SYSTEM

FIELD OF THE INVENTION

The present invention relates generally to electrical testing equipment, and, more particularly, to an electronic device enclosure with communications circuitry configured to connect an electronic device, to a vehicle diagnostic system to perform the functions of an off-board device, such as a scan tool, for retrieving and viewing diagnostic information relating to the vehicle.

BACKGROUND OF THE INVENTION

Modern vehicles typically have a vehicle diagnostic system, including one or more separate computer control modules. Examples of such computer control modules (also known as just "modules") are: a powertrain control module (PCM), an engine control module (ECM), a transmission control module (TCM), an ABS control module, and an air bag control module.

"Off-board devices," such as scan tools and code readers are known in the art. Scan tool and code reader testing devices interface with vehicle diagnostic systems to, e.g., access, display, and/or print vehicle diagnostic information. Scan tools, such as OBD II (On-Board Diagnostics version II) scan tools and there predecessors, are one commonly known and are governed by a number of standards, e.g., SAE J1978 Rev. 1998-02 and SAE J1979 Rev. 1997-09. Scan tools are relatively expensive diagnostic devices that have a relatively large number of features and are typically marketed to professional automobile mechanics and service stations. Scan tools are generally considered to be beyond the means of most automobile hobbyists and the ordinary individual interested in performing simple maintenance or service of a few vehicles, such as a family "fleet" of vehicles.

There are different types of scan tools. An "OBD II Scan Tool" complies with the above-identified specifications. By contrast, a "Manufacturer-Specific Scan Tool" is a scan tool that accesses and displays proprietary manufacturer-specific data (and possibly also additionally accesses and displays OBD II data). Examples include Device Controls on General Motors, On-Demand Tests in Ford, Actuator Tests, Sensor Tests, Interrogator, and Read Temporary Codes in Chrysler. In general, air bag data, ABS data, cruise control data, and climate control data are also considered to be proprietary manufacturer-specific data and are typically included only in Manufacturer-Specific Scan Tools.

An "off-board device" that is a low-cost alternative to the scan tool is a "code reader." In 1998 Actron Manufacturing Corp., the assignee of the present invention, pioneered the first OBD II code reader. In contrast with a scan tool, a code reader is a relatively basic "off-board device" that links with one or more computer modules in a vehicle diagnostic system via a vehicle computer network, reads any diagnostic trouble codes (also referred to as just "diagnostic codes" herein) asserted by those vehicle diagnostic systems, and displays any diagnostic codes on a display. Typical code readers do not perform the following major functions that are performed by typical scan tools: "View Data," also known as "Live Data," "Data," and "Data Test, DTC" (viewing and displaying in real-time live, changing data from a plurality of module sensors), display of textual diagnosis descriptions corresponding to the various diagnostic codes, recording and playback of data, device control (manually controlling modules for diagnostic purposes), and reading and displaying vehicle information from the vehicle's computer (e.g., VIN information, controller calibration identification number, etc.). Code readers are typically marketed to automobile hobbyists and non-professionals who are merely curious about what codes the various vehicle diagnostic systems have stored in their memories.

Off-board devices typically do not include test circuits. Rather off-board devices, such as scan tools and code readers, typically communicate with the vehicle diagnostic system, which does typically include one or more test circuits. Thus, typical off-board devices do not perform any tests themselves; with few exceptions (e.g., the Ford Motor Company NGS scan tool with its harness tester, "sensor simulation"), off-board devices merely report the results of tests performed by test circuitry external to the off-board device.

Electronic devices, such as personal data assistance (PDAs) and pocket PCs are common and currently owned by many mechanics and automobile hobbyists. These electronic devices can be configured to receive and display vehicle diagnostic data similar to the data displayed on expensive scan tools. Thus, if a mechanic or automobile hobbyist currently owns an electronic device, he/she need only purchase software to load onto the electronic device, and an adaptor to connect the electronic device to the vehicle diagnostic system. These types of electronic devices, however, are expensive and easily damaged. As a result, it is undesirable to use such electronic devices in automobile repair shops, and garages where they are subjected to dirt, grease and rough handling.

SUMMARY OF THE INVENTION

The present invention is protective enclosure that is capable of receiving an electronic device, such as a pocket PC or a PDA. The protective enclosure includes an interface device configured to be able to couple to the electronic device and to place the electronic device in circuit communication with a vehicle diagnostic system. In one embodiment, a communications protocol is generated by the interface device to establish communications with the vehicle diagnostic system. The vehicle diagnostic information is received by the interface device, which is configured to be capable of communicating the diagnostic information to the electronic device.

BRIEF DESCRIPTION OF THE DRAWINGS

In the accompanying drawings, which are incorporated herein and constitute a part of this specification, embodiments of the invention are illustrated, which, together with a general description of the invention given above, and the detailed description given below, serve to example the principles of this invention, wherein.

DETAILED DESCRIPTION OF THE DRAWINGS

In general, the present invention is an enclosure for an electronic device. The enclosure includes an interface device capable of coupling to an electronic device, such as a pocket PC or a PDA. In addition, the interface device is capable of establishing circuit communication between the vehicle diagnostic system and the electronic device. The circuit communication can be established via hard wire or a wireless device.

"Circuit communication" as used herein indicates a communicative relationship between devices. Direct electrical, electromagnetic, and optical connections and indirect electrical, electromagnetic, and optical connections are examples of circuit communication. Two devices are in circuit communication if a signal from one is received by the other, regardless of whether the signal is modified by some other device. For example, two devices separated by one or more of the following—amplifiers, filters, transformers, optoisolators, digital or analog buffers, analog integrators, other electronic circuitry, fiber optic transceivers, Bluetooth communications links, 802.11b communications links, or even satellites-are in circuit communication if a signal from one is communicated to the other, even though the signal is modified by the intermediate device(s). As another example, an electromagnetic sensor is in circuit communication with a signal if it receives electromagnetic radiation from the signal. As a final example, two devices not directly connected to each other, but both capable of interfacing with a third device, e.g., a CPU, are in circuit communication. 100231 As discussed earlier, most modern vehicles have one or more computer modules that are linked together along a common data bus. The modules and common data bus together form the vehicle diagnostic system. Vehicles equipped with vehicle diagnostic systems generally have a data link connector located in the occupant compartment of the vehicle. The data link connector is connected to the vehicle diagnostic system. One purpose of the data link connector is to facilitate the connection of a scan tool that can be used, for among other things, to read the error/fault codes that are generated by the vehicle computer modules. An electronic device, with the power of current PDAs and Pocket PC's, coupled with an interface device can be configured to perform the functions of an off-board device, such as a scan tool.

Figure 1A:
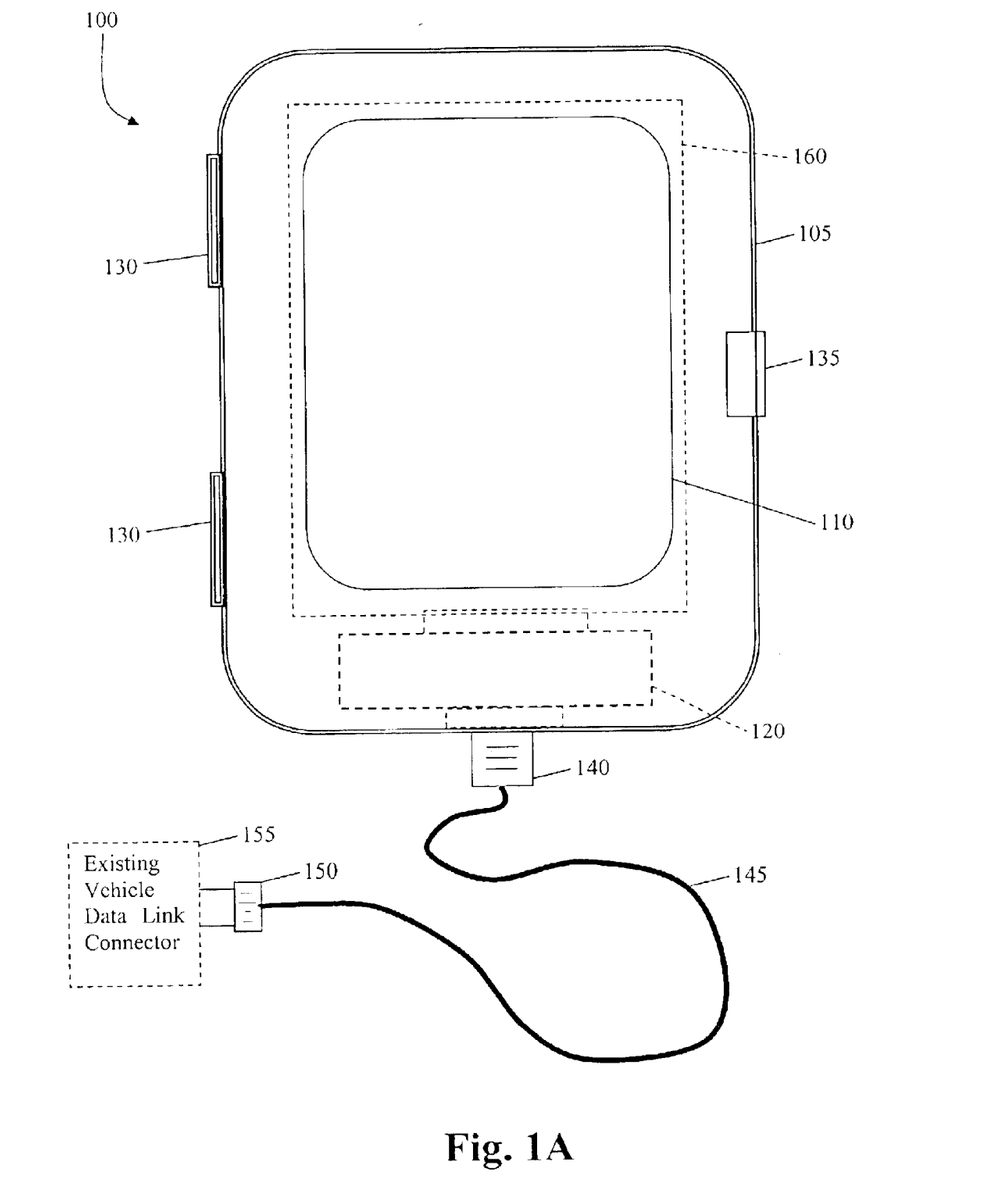
FIG. 1A is an enclosure, the enclosure being closed, with an OBD interface device connected to a vehicle diagnostic system.
Figure 1B:
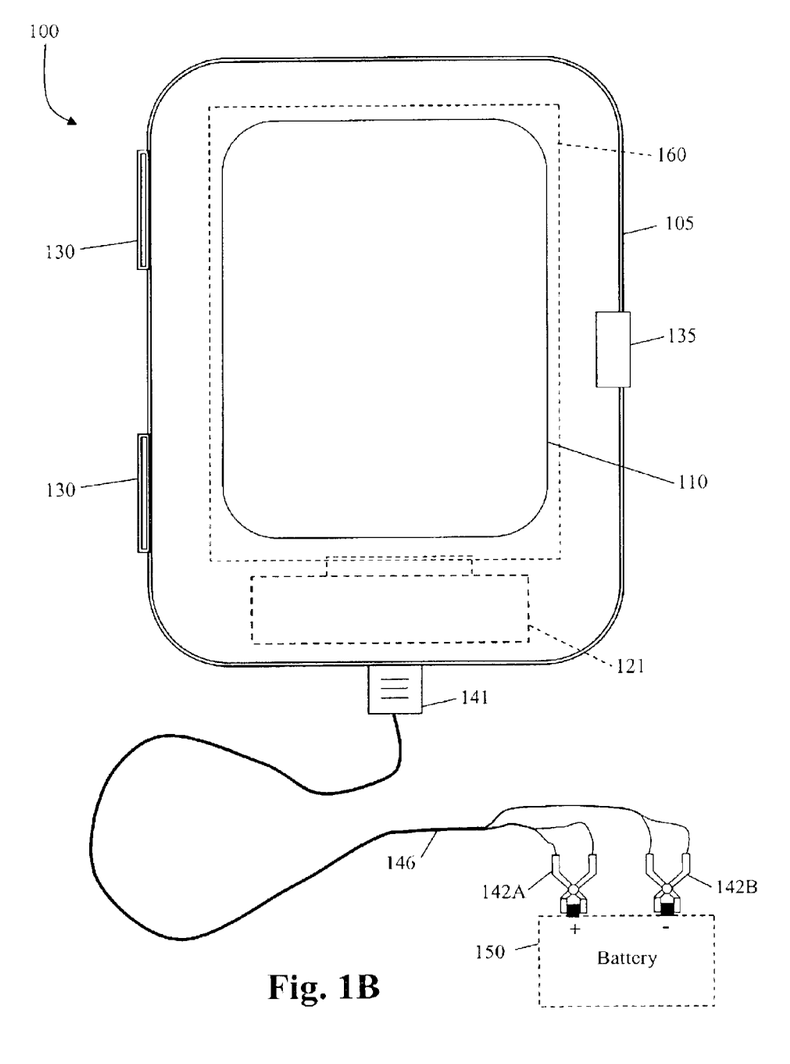
FIG. 1B is an enclosure, the enclosure being closed, with an SBC interface device connected to a battery.
Figure 2A:
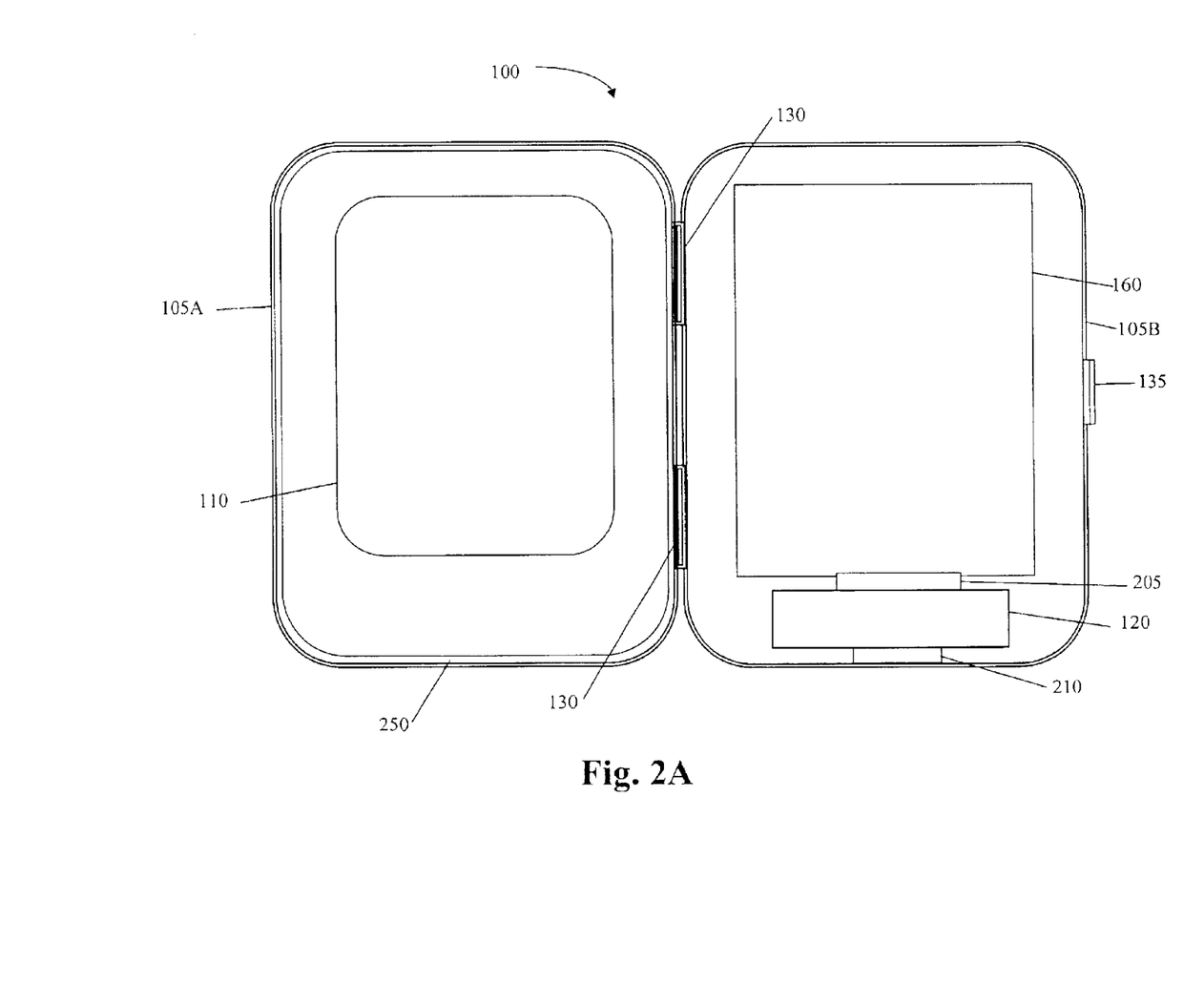
FIG. 2A is a plan view of an enclosure, the enclosure being open, with an OBD interface device in accordance with the present invention.
Figure 2B:
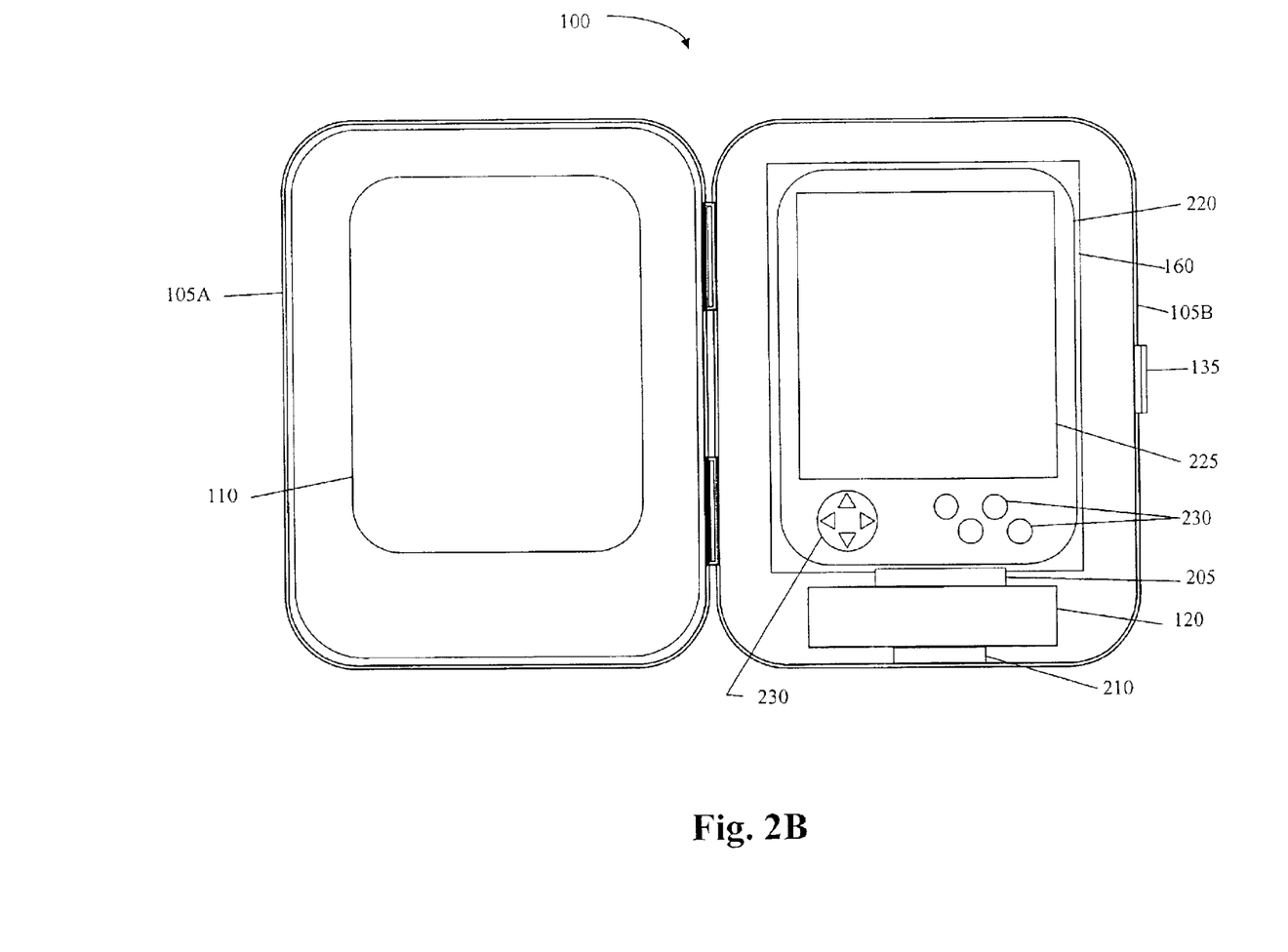
FIG. 2B is a plan view of an enclosure, the enclosure being open, with an OBD interface device and an electronic device in accordance with the present invention.

FIGS. 1, 2A and 2B illustrate one embodiment of a protective enclosure with an interface device 100. The enclosure is a rugged/protective enclosure that is designed to protect an electronic device, such as a PDA or Pocket PC, from damage while being used as an off-board device. While it is readily known to those in the art that electronic devices, such as PDAs and Pocket PCs, have their own enclosures, the rugged/protective enclosure provides additional protection for the electronic device. Still additional protection can be obtained by adding shock absorbing foam inside the protective enclosure around the electronic device.

In addition, custom electronic devices having all of features of a PDAs or Pocket PCs can be obtained. A custom electronic device contains all of the computing power and display capabilities of the PDAs and Pocket PCs, but can be configured in a variety of different ways. For example, the size of the display can be enlarged, or oriented in another direction, the keys can be reconfigured, or removed in their entirety, in which case an external keypad located on the protective enclosure would be used to manipulate the electronic device. In addition, the components of the electronic device can be enclosed in minimal packaging for permanently mounting in the protective enclosure.

In one embodiment, the protective enclosure includes a housing 105, hinges 130, a clasp 135 and an OBD interface device 120. Preferably the housing is made of polycarbonate; however the housing can be made of any one or more conventional materials, such as plastic, metal, a composite, etc. Preferably the housing 105 is formed by two members, a fist member 105A, and a second member 105B (see FIG. 2). The first member 105A and second member 105B are pivotally connected by a pair of hinges 130 so that the first member 105A and the second member 105B can be opened, as shown in FIG. 2, to receive an electronic device, and closed as shown in FIG. 1. The first and second members 105A, 105B, respectively, are held in the closed position by the clasp 135. The clasp 135 is made of a flexible material that has a memory permitting the clasp 135 to spring back to the closed position upon release of the clasp 135 from the open position. Alternatively the clasp 135 can be held in the closed position by a spring. In addition, any conventional fastening mechanism can be used to secure the fist member 105A to the second member 105B. While the present embodiment is described as being formed with two housing members, any number of members can be used to form the protective enclosure. For example, the protective enclosure could be made up of three members, wherein interface device circuitry can be enclosed between a first and second member (not shown) and an electronic device can be enclosed between the second member and a third member, permitting the electronic device to be inserted and removed without exposing the interface device circuitry. Further the housing members may be secured to one another in any conventional manner, such as with hinges, screws or snaps, etc., and any manner of securing the housing members together is within the spirit and scope of the present invention.

The first member 105A has a window 110. Preferably, the window is constructed of a transparent flexible material that enables a user to manipulate buttons 230 on electronic device 220 (FIG. 2B). Still more preferably, the material is flexible enough to allow a user to manipulate a touch screen display 225 on the electronic device 220 that is at least partially retained in the enclosure. Alternatively, the window can be composed of clear polycarbonate or any conventional transparent material, such as Plexiglas. In yet another alternative, the entire housing 105, or first member 105A, can be made of clear polycarbonate eliminating the need for a window. In such a case, an alternative method of manipulating the electronic device can be provided, such as adding push buttons to the enclosure that contact the buttons 230 on the electronic device, or adding a keypad in circuit communication with the OBD interface device 120.

Located in the housing 105 is an OBD interface device 120. The OBD interface device 120 is secured to the second member 105A of housing 105. The interface device includes a first interface port connector 205. The first interface port connector 205 is configured to facilitate communications between the OBD interface device 120 and an electronic device 220. The first interface port connector 205 can be any type of communications interface port connector, such as a serial port connector, a USB port connector, an infrared port, an RS 232 port connector, a port connector that is proprietary to the manufacturer of the electronic device 220, or any other conventional communications port connector. Preferably the electronic device 220 has a USB port connector (not shown) and is connected to the first interface port connector 205 via a USB connector. The physical mating of the connectors at least partially retains the electronic device 220 inside the housing 105. Another method of retaining the electronic device 220 inside the housing 105 is with a foam insert 160. The foam insert 160 can be used alone, to retain the electronic device 220, such as with an infrared or a wireless communication port, and/or used in combination with a mechanical fastener (not shown) or a connector, as described above. The foam insert 160 is custom fit for the type of electronic device 220 that is being used. In addition to securing the electronic device 220 in place, the foam insert 160 provides additional shock protection.

In addition, the OBD interface device 120 includes a second interface port connector 210 configured to facilitate communications between the OBD interface device 120 and the vehicle diagnostic system. The second interface port connector 210 can be any type of communications interface port connector, such as a serial port connector, a USB port connector, an infrared port connector, an RS 232 port connector, or any other conventional communications port connector. Preferably the OBD interface device 120 has a communications port connector (not shown) that is compatible with a standard OBD II diagnostic communications connector and is connected to the vehicle diagnostic system via a cable. The cable has an OBD II cable connector 140 attached to a first end, and a first data link connector 150 attached to a second end. The cable connector 140 is placed into the second interface port connector 210. The first data link connector 150 is plugged into a second data link connector 155, located in a vehicle, placing the OBD interface device 120 in circuit communications with the vehicle diagnostic system.

An alternative embodiment illustrated in FIG. 1B is substantially the same as the embodiment in FIG. 1A. Instead of having an OBD interface device 120, however, the embodiment has a SBC interface device 121. The SBC interface device 121 is configured to test a starter/charger system in a vehicle (not shown), and/or a battery 150.

The SBC interface device 121 is secured to the second member 105A of housing 105. The interface device includes a first interface port connector 205. The first interface port connector 205 is configured to facilitate communications between the SBC interface device 121 and an electronic device 220. The first interface port connector 205 can be any type of communications interface port connector, such as a serial port connector, a USB port connector, an infrared port, an RS 232 port connector, a port connector that is proprietary to the manufacturer of the electronic device 220, or any other conventional communications port connector. Preferably the electronic device 220 has a USB port connector (not shown) and is connected to the first interface port connector 205 via a USB connector.

The SBC interface device 121 includes a second interface port connector 210 configured to facilitate communications between the SBC intake device 121 and a starter/charger system and/or a battery. The second interface port connector 210 can be any type of communications interface port connector, such as a serial port connector, a USB port connector, an infrared port connector, an RS 232 port connector, or any other conventional communications port connector. Preferably both cable 145 and cable 146 are configured to connect to tee same type of port connector 210. A cable 146 has a cable connector 141 attached to a first end, and a pair of clips 142A and 142B attached to a second end. The cable connector 141 is placed into the second interface port connector 210. Preferably cable 146 and clips 142 provide a Kelvin type connection between the SBC interface device 121 and the battery 150. A Kelvin type connection is a four (4) wire connection, wherein two wires are connected to each terminal of the battery. The SBC interface device 121 will be described in more detail below in reference to FIG. 4B.

Preferably, in addition to testing the battery, the starter/charger system tester is capable of testing the alternator and the starter motor of a vehicle. A typical starter/charger system tester is described in Actron's co-pending U.S. application Ser. No. 09/813,104 entitled Handheld Tester for Starting/Charging Systems, and Actron's copending continuation application also entitled Handheld Tester for Stating/Charging Systems, which are incorporated herein in their entirety.

Figure 3A:
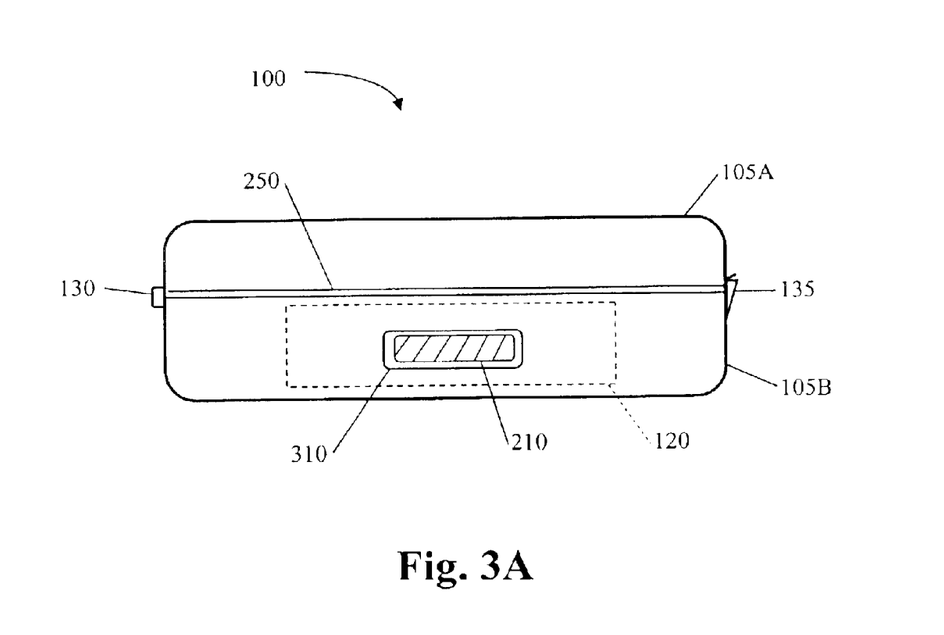
FIG. 3A is an end view of an enclosure with an OBD interface device in accordance with the present invention.

FIG. 3A illustrates an end view of one embodiment of the protective housing with an interface device 100 in accordance with the present invention. The housing 105 includes a first member 105A hingedly connected to a second member 105B. The second member 105B has an opening 310 in one end configured to provide access to the second interface port connector 210. The opening 310 can be sealed with silicon, or any other suitable sealant, around the interface port connector 210 to prevent moisture or dirt from entering into the housing. In addition, a gasket 250 can be secured to the first member 105A. The gasket 250 is clamped between the first member 105A and the second member 105B to provide a moisture/dirt resistant barrier between the inside and outside of the housing 105 when the first member 105A and second member 105B are in the closed position. Further if the OBD interface device 120 communicates with the vehicle diagnostic system via wireless communications, the opening 310 may replaced with a transparent window in the end of the enclosure for use with infrared, ultraviolet, optical etc. In addition, the opening 310 can be configured to receive an antenna for wireless communications via, radio frequency, Blue tooth communications, or 802.11 communications.

Figure 3B:
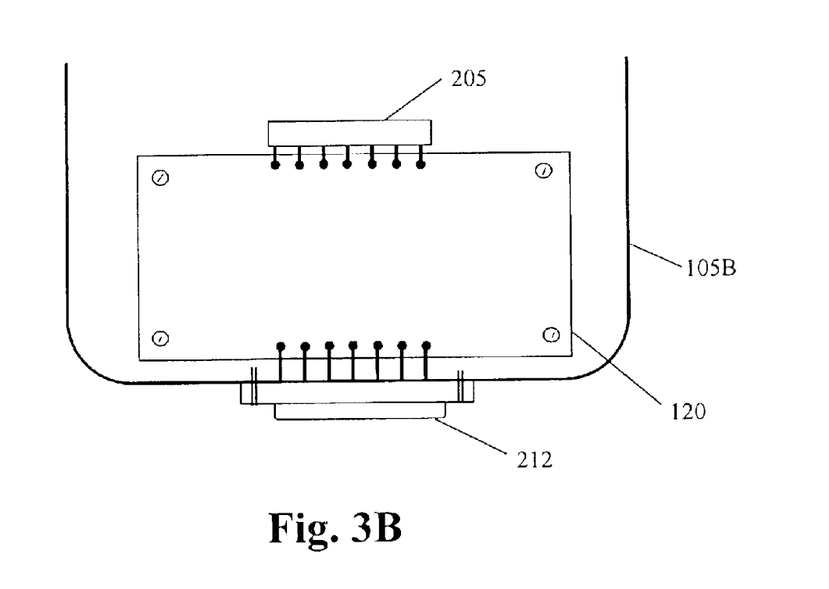
FIG. 3B is a plan view of an enclosure with an OBD interface device in accordance with the present invention.

FIG. 3B illustrates a plan view of another embodiment of the protective housing with an interface device 100 in accordance with the present invention. The OBD interface device 120 is a printed circuit board secured to the second member 105B of the housing 105. The OBD interface device 120 includes a first interface port connector 205 configured to connect to an electronic device, and a second interface port connector 212 configured to connect to an OBD II connector (not shown) secured to the second member 105B of the housing 105.

Figure 4A:
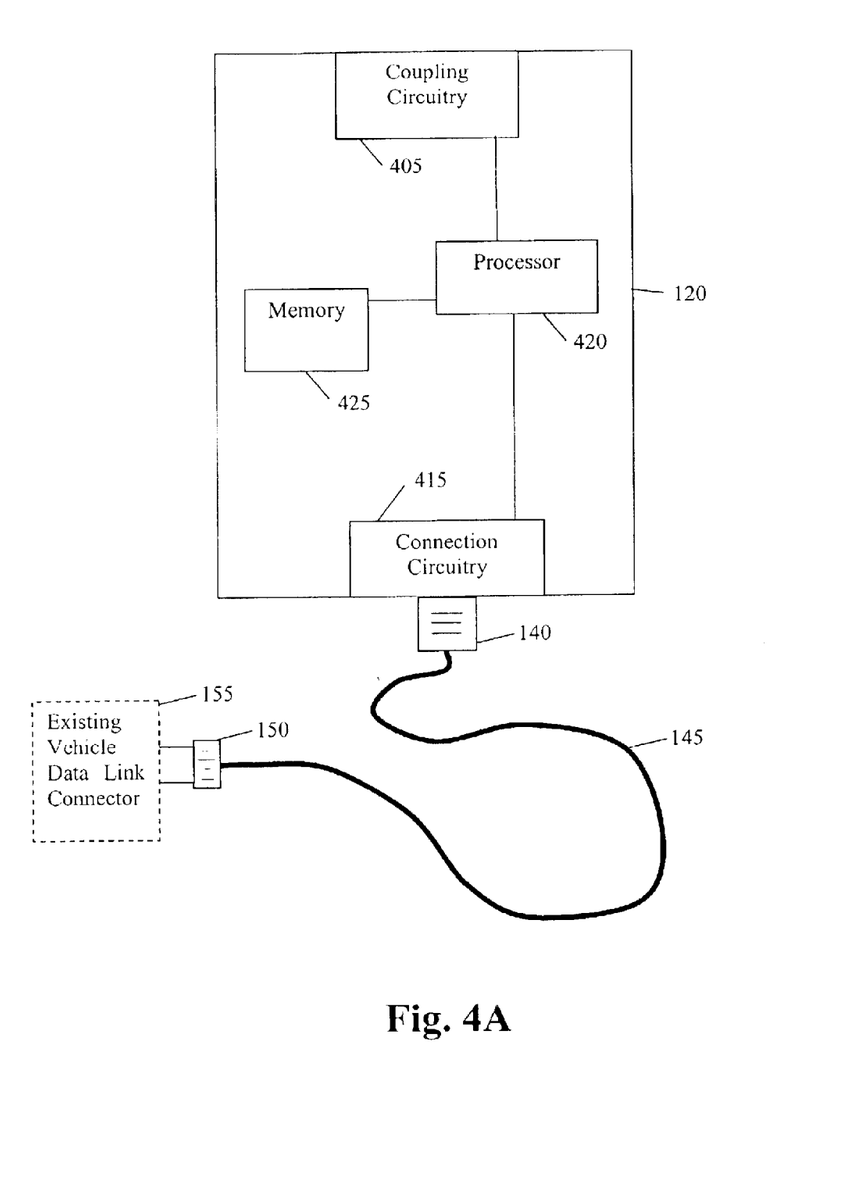
FIG. 4A is a high level block diagram of an OBD interface device in accordance with the present invention.

FIG. 4A illustrates one embodiment of an OBD interface device 120 in accordance with the present invention. The OBD interface device 120 includes connection circuitry 415, memory 425, and coupling circuitry 405 in circuit communication with a processor circuit 420. The processor circuit 420, also referred to herein as just processor 420, may be one of virtually any number of processor systems and/or stand-alone processors, such as microprocessors, microcontrollers, and digital signal processors, and has associated therewith, either internally therein or externally in circuit communication therewith, associated RAM, ROM, EPROM, clocks, decoders, memory controllers, and/or interrupt controllers, etc. (all not shown) known to those in the art to be needed to implement a processor circuit. The connection circuitry 415, and coupling circuitry 405 are shown inside the adaptor 120 for convenience purposes only and it should be obvious to one skilled in the art that the circuitry could be located outside the adapter 120 in a number of convenient locations. In addition, the OBD interface device 120 includes memory 425 that is separate from the processor, but is in circuit communications with the processor. The memory 425 can be any conventional memory or a discrete device.

Further the connection circuitry 415 is in circuit communication with the second interface port connector 212 to facilitate communications between the OBD interface device 120 and the vehicle diagnostic system. Preferably, the connection circuitry 415 and processor 420 generate one or more communications protocols with which the electronic device and the vehicle computer network communicate with one-another. The connection circuitry 415 can be implemented either in hardware, or in software, or in a combination of hardware and software. Typical communications protocols generated by the connection circuitry 415 include but are not limited to: SAE J1850 (VPM), SAE J1850 (PWM), ISO 9141-2, and ISO 142304 ("Keyword 2000"). The present invention is not intended to be limited to any specific communications protocol, or even to electrical communications protocols. Other present and future protocols, such as fiber optic, ISO 1532-4, MS CAN, HS CAN and wireless communications protocols such as Bluetooth communications protocol and 802.11b communications protocol are also contemplated as being within the spirit and scope of the present invention.

The coupling circuitry 405 of the OBD interface device 120 in circuit communication with the first interface port connector 205 to facilitate communications between the electronic device (not shown) and the OBD interface device 120. Just as above, the coupling circuitry 405 can be implemented either in hardware, or in software, or in a combination of hardware and software. The coupling circuitry 405 permits the OBD interface device 120 to be placed in circuit communication with the electronic device via a port connector of the electronic device. Just as with the first and second interface port connectors 205, 212, respectively, the port connector of the electronic device can be any type of communications interface port connector, such as a serial port connector, a USB port connector, an infrared port, an RS 232 port connector, an Ethernet port connector, a port connector that is proprietary to the manufacturer of the electronic device, or any other conventional communications port or wireless link, such as Bluetooth wireless link The OBD interface device 120 can contain scan tool type software, such as error/fault codes, communications protocols etc. and simply communicate to the results of the diagnostic tests to the electronic device 220 for display. On the other hand, the function of the OBD interface device 120 can be as simple as a communications translator, wherein the electronic device 220 generates the communications protocol, transmits the communications to the OBD interface device 120 via the first interface port connector 205, e.g. a USB port connector, the OBD interface device 120 receives the communications and passes the communications through the second interface port connector 212, cable connector 140, cable 145, data link connector (DLC) 150 to the vehicle diagnostic system.

In addition, vehicle manufacturers may eliminate the data link connectors located in the occupant compartment, and replace the data link connector with a wireless communications systems. It is within the spirit and scope of this invention that the OBD interface device 120 can be connected to the vehicle diagnostic system by a wireless communications port, such as through an infrared port, Bluetooth communications port, or any other wireless communications ports.

Figure 4B:
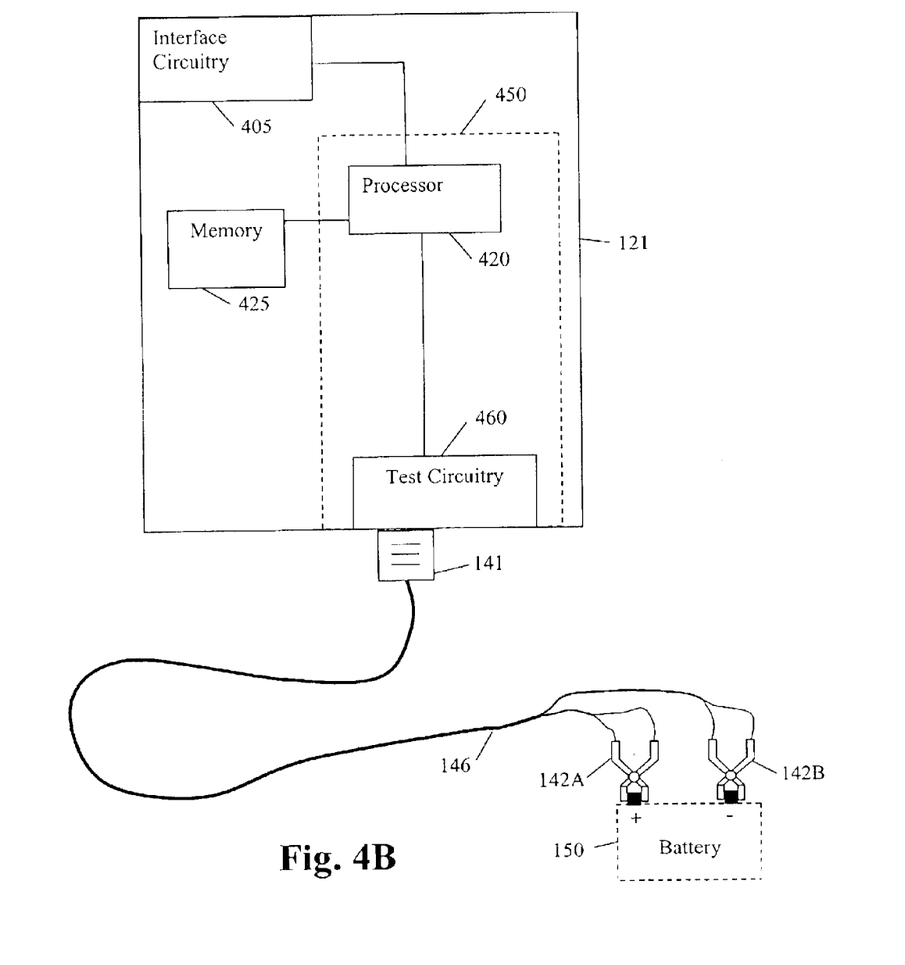
FIG. 4B is a high level block diagram of an SBC interface device in accordance with the present invention.

Similarly, FIG. 4B illustrates one embodiment of an SBC interface device 121. Preferably, the SBC interface device 121 includes test circuitry 450, memory 425, and coupling circuitry 405 in circuit communication with a processor circuit 420. The processor circuit 420, also referred to herein as just processor 420, may be one of virtually any number of processor systems and/or stand-alone processors, such as microprocessors, microcontrollers, and digital signal processors, and has associated therewith, either internally therein or externally in circuit communication therewith, associated RAM, ROM, EPROM, clocks, decoders, memory controllers, and/or interrupt controllers, etc. (all not shown) known to those in the art to be needed to implement a processor circuit.

The test circuitry 450, and coupling circuitry 405 are shown inside the adaptor 120 for convenience purposes only and it should be obvious to one skilled in the art that the circuitry could be located outside the adapter 121 in a number of convenient locations. In addition, the SBC interface device 121 includes memory 425 that is separate from the processor, but is in circuit communications with the processor. The memory 425 can be any conventional memory or a discrete device.

The SBC interface device 121, shown in FIG. 4B, preferably includes an electronic test circuit 350 that tests the starting/charging system (not shown). The test circuit 450 preferably includes a discrete test circuit 460 in circuit communication with an associated processor 420. In the alternative, the test circuit 450 can consist of discrete test circuit 460 without an associated processor circuit. Additional information relating to the function of the test circuit can be found in Actron's co-pending U.S. application Ser. No. 09/813,104 entitled Handheld Tester for Starting/Charging Systems, which is incorporated herein in its entirety.

Further the test circuitry 450 is in circuit communication with the second interface port connector 212 to facilitate communications between the SBC interface device 121 and the starter/charger system and/or battery.

The coupling circuitry 405 of the SBC interface device 121 is in circuit communication with the first interface port connector 205 to facilitate communications between the electronic device (not shown) and the SBC interface device 121. Just as above, the coupling circuitry 405 can be implemented either in hardware, or in software, or in a combination of hardware and software. The coupling circuitry 405 permits the SBC interface device 121 to be placed in circuit communication with the electronic device via a port connector of the electronic device. Just as with the first and second interface port connectors 205, 212, respectively, the port connector of the electronic device can be any type of communications interface port connector, such as a serial port connector, a USB port connector, an infrared port, an RS 232 port connector, an Ethernet port connector, a port connector that is proprietary to the manufacturer of the electronic device, or any other conventional communications port or wireless link, such as Bluetooth wireless link.

The SBC interface device 121 can contain starter/charging system software and simply communicate to the results of the diagnostic tests to the electronic device 220 for display. On the other hand, starter/charging system software can be stored in the electronic device 220 and the electronic device 220.

The interface devices have been described herein in separate embodiments, however, one interface device can be configured to provide an interface between an electronic device and both the vehicle diagnostic system and the starter/charger system. Furthermore, it is contemplated, and within the spirit and scope of this invention that the device is configured for use with interchangeable leads, such that a first cable can be releasably connected to the connector to place the interface device in circuit communication with the vehicle diagnostic system, and a second cable can be releasably connected to the connector to place the interface device in circuit communication with the starter/charger system, or a battery.

Further, one embodiment provides for automatically detecting which cable is connected to the device, and automatically performing the correct testing function based on the type of cable connected to the device. Additional information relating to the interchangeable leads and auto-detection of the leads can be found in Actron's copending patent application Ser. No. 09/813,104, Handheld Tester for Starting/Charging Systems, which again, is incorporated herein in its entirety.

Figure 5:
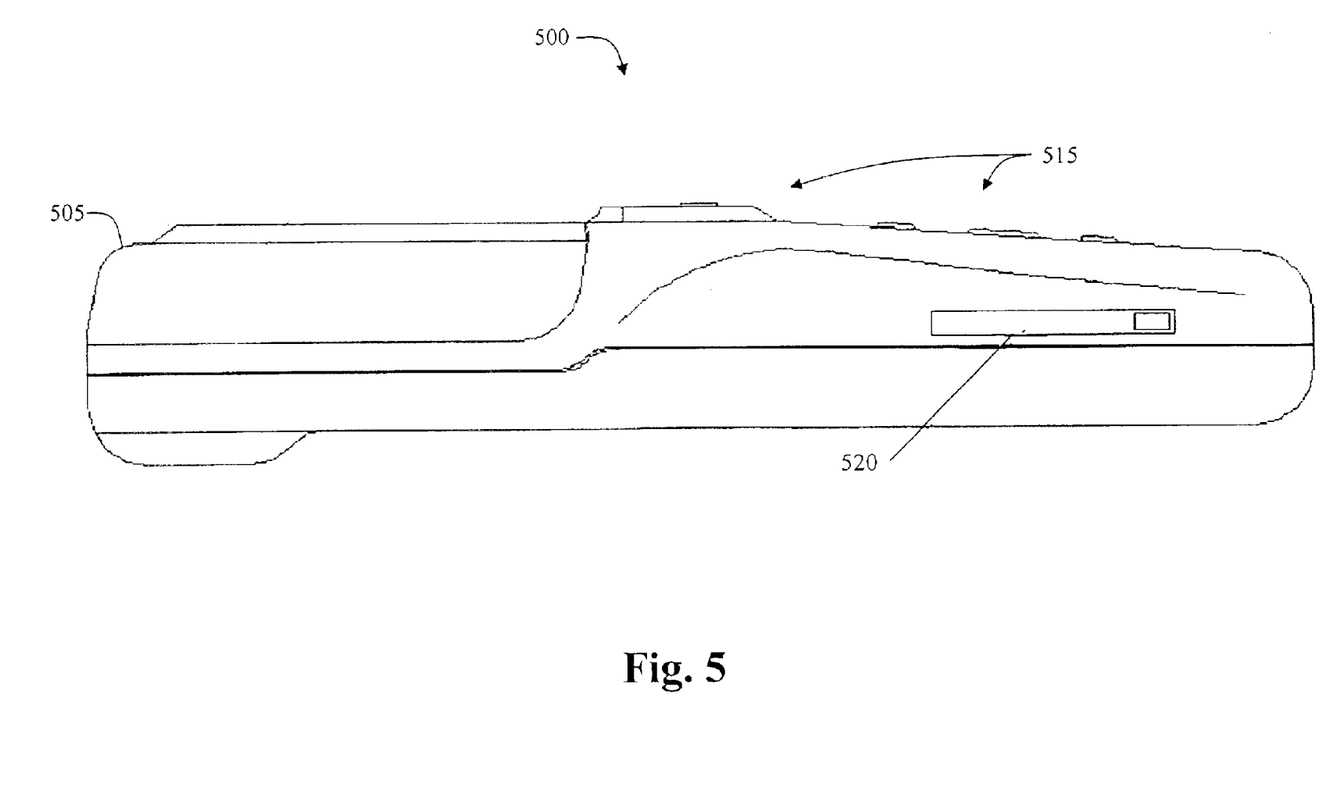
FIG. 5 is side view of another embodiment of an enclosure with an OBD interface device in accordance with the present invention.
Figure 6:
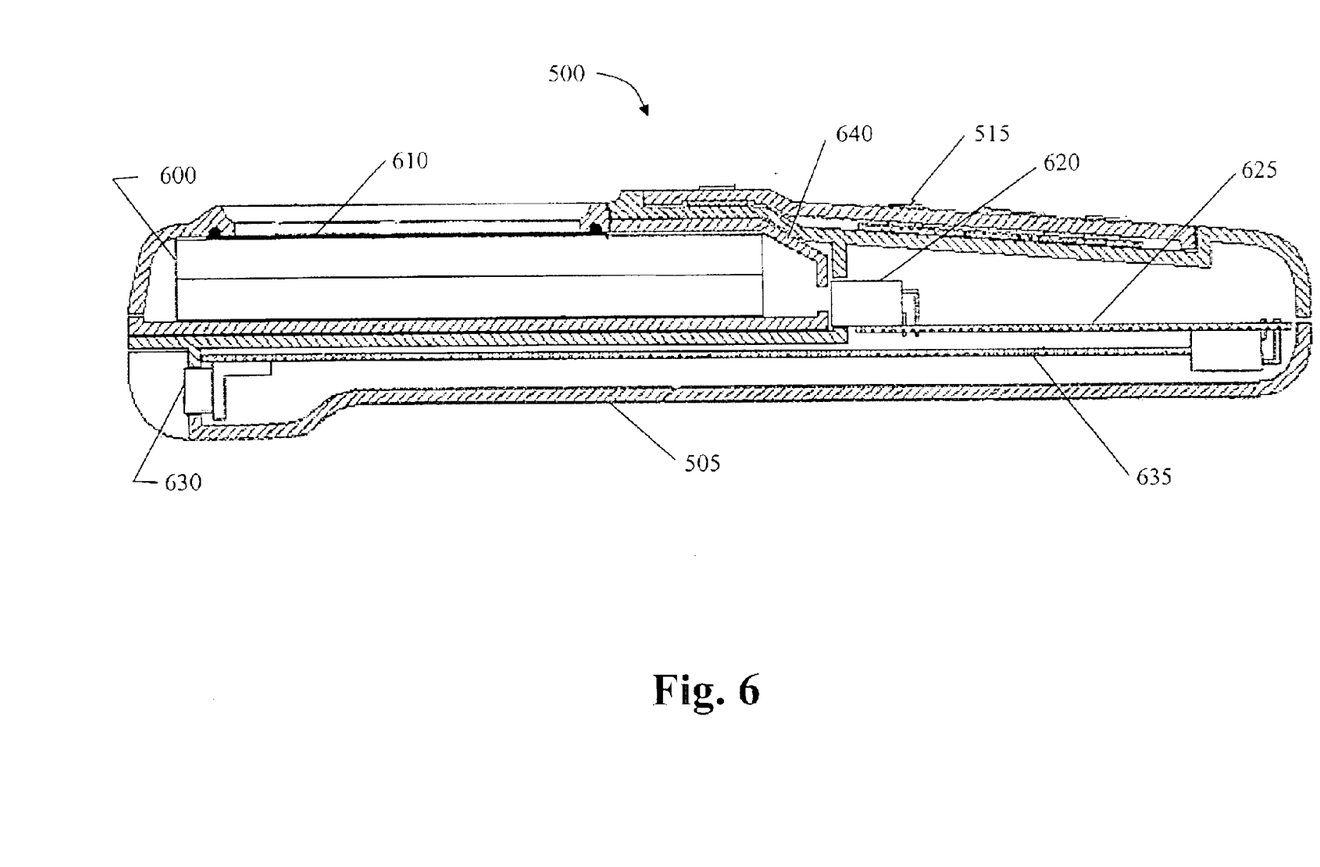
FIG. 6 is a cut away view of the embodiment illustrated in FIG. 5.

FIGS. 5 and 6 illustrate another embodiment of an enclosure with an interface device 500 in accordance with the present invention. As shown in FIG. 5, the enclosure with an interface device 500 includes a housing 505, a keypad 515 and a PCMCIA slot 520. As further illustrated in FIG. 6, the enclosure with an interface device 500 further includes a screen protector 610, a first PCB port 620, an interface printed circuit board (PCB) 625, a main PCB 635 and a second PCB port 630. In addition, FIG. 6 shows an electronic device 600 located in the housing 505 and electrically coupled to the first PCB port 620. In one embodiment, the electronic device is retained in a plastic housing 640 that snaps into the enclosure 505.

The keypad 515, interface PCB 625, first PCB port 620, main PCB 635, and second PCB port 630 are all in circuit communications. The enclosure with an interface device 500 is configured to receive the electronic device 600. The electronic device 600 has an interface port, as described above, and when the electronic device 600 is inserted into the enclosure 505 the electronic device 600 is placed in circuit communication with the first PCB port 620.

As noted earlier, the electronic device 600 can be a custom electronic device with the computing power provide by conventional PDAs and Pocket PCs, but configured in a different layout. The custom electronic enclosure can, for example, have a larger screen, or a screen that is oriented in a different direction then standard PDAs and Pocket PCs. Further the custom electronic device can be configured with different key layouts, or even without a keypad. Additionally, the custom electronic device can be packaged together with a minimally protective housing, or be packaged with no protective housing, relying on the protective enclosure retaining the electronic device for protection from abuse.

The electronic device 600 is placed inside the housing 505 so that the display screen (not shown) on the electronic device 600 is visible through the screen protector 610. Preferably the screen protector 610 is made of a thin transparent membrane to permit manipulation of the electronic device 600 through the screen protector 610. Alternatively the screen protector 610 can be transparent Plexiglas or other composite material and the manipulation of the electronic device can be accomplished with the keyboard 515 via the interface PCB 625 and first PCB port 620. Still yet, the screen protector 610 can be a transparent material that is hingedly connected to the housing so that an operator can rotate the screen protector 610 out of the way to access the touch screen of the electronic device 600. The keypad 515 can be any conventional keypad or membrane and is used to initiate the desired scan tool functions. The keypad 515 can be electrically coupled to the electronic device 600, the interface PCB 625 and/or the main PCB 635. The interface PCB 625 generates the proper communications protocol to communicate with the electronic device 600.

Software can be loaded onto the electronic device 600 in any conventional manner, such as from a personal computer or downloaded from a network via a PCMCIA card (not shown) located in the electronic device 600. The PCMCIA slot 520 is electrically coupled to the processor on the main PCB 635. The enclosure with an interface device 500 can be configured to connect to a network in any conventional method, such as though hard wire, or wireless communications. Further if the electronic device 600 does not have enough memory to handle and display diagnostic information received from a vehicle diagnostic system, a memory card can be inserted into the one or more memory expansion slots (not shown) that are typically provided with the electronic device. Further, a memory card (not shown) can be inserted into the PCMCIA slot to increase the memory capacity of the electronic device 600, or the main PCB 635. In addition, the memory card can contain programming logic, error codes, etc., for retrieving and interpreting the diagnostic information or even reprogramming the vehicle diagnostic system computer.

The enclosure with an interface device 500 can be connected to a vehicle diagnostic system as described above. Preferably the second PCB port 630 is connected to an OBD-II connection port located in the occupant compartment of the vehicle via a cable and the proper data link connectors. Upon connecting the present invention to the vehicle diagnostic system, the main PCB 635 generates the proper communications protocol to communicate with the vehicle diagnostic system, and downloads the vehicle diagnostic information. The vehicle diagnostic information is processed on the main PCB 635 and communicated to the interface PCB 625 where the processed information is translated to the proper communications protocol and communicated for display on the electronic device 600. In another embodiment the main PCB 635 performs all of the functions identified as being performed by interface PCB 625. Thus interface PCB 625 becomes simply a pass through device such as a cable, or is eliminated in its entirety.

Figure 7:
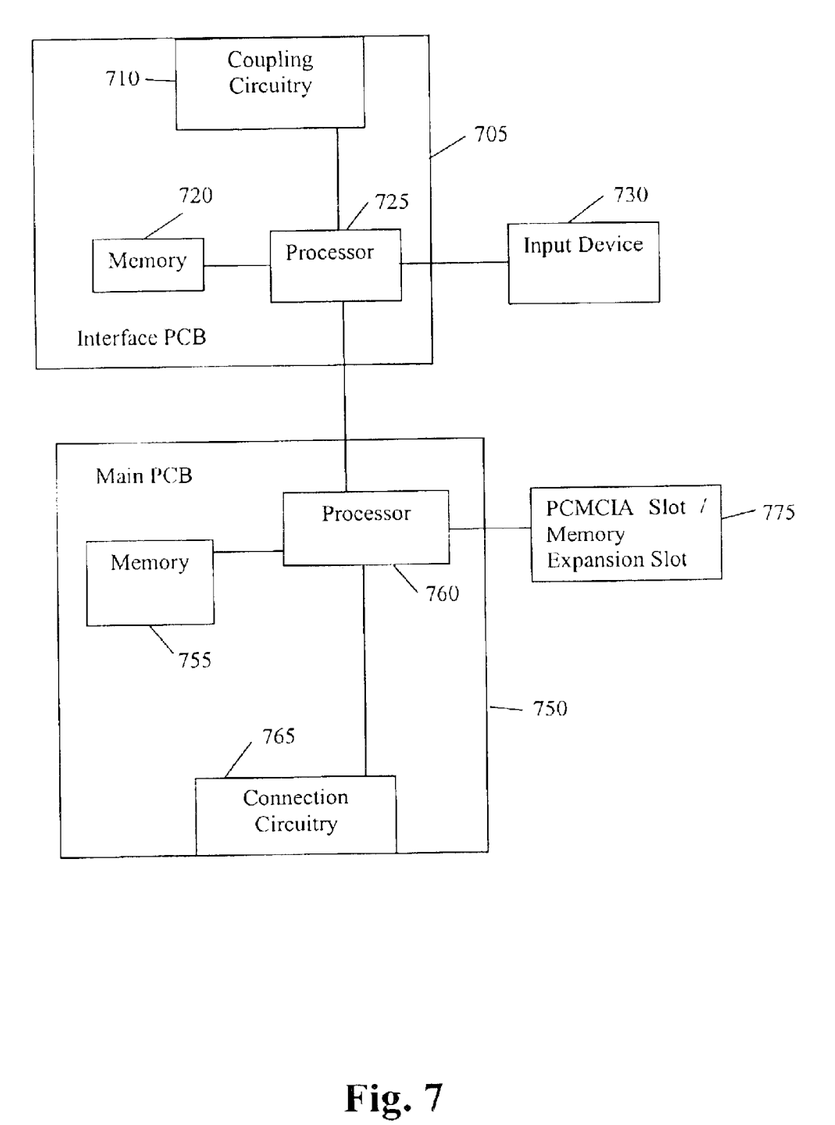
FIG. 7 is a high level block diagram of another OBD interface device in accordance with the present invention.

FIG. 7 illustrates an interface device 700 in accordance with the present invention. The interface device 700 includes an interface PCB 705, a main PCB 750, an input device 730, and a PCMCIA slot 775. The interface device 700 is similar to the OBD interface device 120 illustrated in FIG. 4. The interface device 700, however, includes two processors and includes features not disclosed in FIG. 4, such as the input device 730, and PCMCIA slot 775.

Preferably the input device 730 is a keypad, however the input device 730 can by any conventional input device, such as push buttons, selector switches, touch screens, etc. The input device 730 is in circuit communication with a first processor 725, a first memory 720, and coupling circuitry 710 located on the interface PCB 705. A user initiates the off-board device process via the input device 730. The first processor 725 and memory 710 generate a communications protocol to communicate with an electronic device (not shown) though the coupling circuitry 710. The first processor 725 is in circuit communication with, and interfaces between the electronic device (not shown) and second processor 760 of the main PCB 750.

The main PCB 750 is placed in circuit communication with a vehicle diagnostic system as described above. The second processor 760 and memory 755 generate a communications protocol to communicate with the vehicle diagnostic system. The second processor 760 receives vehicle diagnostic information from the vehicle diagnostic system and processes the data into human readable form for display on the electronic device. The processed data is communicated to the processor 725 on the interface PCB 705 where the data is translated to the appropriate communications protocol to communicate with the electronic device. The translated, information is communicated to the electronic device for display.

It should be understood that the generation of communications protocols, storage of programming logic, processing of vehicle diagnostic information etc. can be handled by the processor located on the main PCB 750, the processor located on the interface PCB 705, the processor in the electronic device, or any combination thereof. Each of which are contemplated and within the spirit and scope of the present invention. Further the components on the interface PCB 705 can reside on the main PCB 750, or to the extent the functions can be performed on the main PCB 750, the components on the interface PCB 705 can be eliminated.

The second processor 775 is in circuit communications with a PCMCIA slot 775. Any conventional PCMCIA card/memory expansion card (not shown) can be inserted into the PCMCIA slot 775 to facilitate communications with a network or a computer, such as a standard modem card or a Bluetooth wireless communications card. The PCMCIA card enables the present invention to transmit the results of the vehicle diagnostic information to a main terminal. An experienced technician can review the diagnostic information and recommend the required parts to correct the defect in the vehicle. In addition, the diagnostic information can be transmitted to a main terminal as part of an automotive emissions check. For example, the owner of a vehicle can take the vehicle to a service station to obtain an emissions check certification to enable the owner to purchase new license plate tags. The service station attendant can connect the present invention to the automobile, enter the vehicle identification number, conduct the test and transmit the diagnostic information to the main terminal. The main terminal can evaluate the diagnostic information and transmit a pass/fail certificate back to the service station, where the certificate can be printed out and given to the vehicle owner. If the vehicle owner receives a passing certificate, the owner can take the certificate to the license bureau and obtain license plate tags.

In addition, programming logic and error codes can be downloaded to the present invention via the PCMCIA card. Thus the programming can be updated remotely when vehicle manufactures introduce new model years with additional error/fault codes. In addition, a user can purchase programming for specific make and manufacturers of vehicles and download only the programming code required for those vehicles. The PCMCIA card can be used to download the required logic to generate the proper communications protocol between the enclosure with an interface adaptor and an electronic device.

Further, a memory card can be inserted in the PCMCIA slot 775 to provide additional memory for the main PCB 635, and/or the electronic device. The memory card can also contain programming logic for use by the main PCB 635. Thus, if the need arises to update the programming of the device, a user simply needs to download the updated programming logic to a memory card with a standard computer, and simply insert the memory card into the PCMCIA slot 775. This eliminates the need to send the device to the manufacturer for updating, as well as eliminating the need to take the device out of service for an extended period of time for reprogramming.

While the present invention has been illustrated by the description of embodiments thereof, and while the embodiments have been described in some detail, it is not the intention of the applicant to restrict or in any way limit the scope of the appended claims to such detail. Additional advantages and modifications will readily appear to those skilled in the art. For example, gaskets can be added between the first and second members, and between the second interface port and its associated opening, thus creating a oil/water resistant enclosure. Therefore, the invention in its broader aspects is not limited to the specific details, representative apparatus and methods, and illustrative examples shown and described. Accordingly, departures may be made from such details without departing from the spirit or scope of the applicant's general inventive concept.

I claim:

1. A secondary enclosure for facilitating communications between a hand held electronic device, which is housed in a separate enclosure, and a vehicle diagnostic system, the secondary enclosure comprising:
   a housing for removably receiving at least a portion of the hand held electronic device, and
   an OBD interface device at least partially enclosed in the housing;
   the OBD interface device comprising,
      coupling circuitry configured to facilitate communications between the hand held electronic device and the OBD interface device, and
      connection circuitry configured to facilitate communications between the vehicle diagnostic system and the OBD interface device.

2. The secondary enclosure of claim 1 wherein the OBD interface device further comprises:
   a processor in circuit communication with the coupling circuitry and the connection circuitry, the processor executing code to facilitate interfacing between the handheld electronic device and the vehicle diagnostic system.

3. The secondary enclosure of claim 1 wherein the housing comprises:
   a first member,
   a second member, and
   an opening configured to allow access to the OBD interface device.

4. The secondary enclosure of claim 1 wherein the housing comprises a transparent portion to permit a display of the hand held electronic device to be seen by a user while the hand held electronic device is at least partially received by the housing.

5. The secondary enclosure of claim 4 wherein the transparent portion is pivotally connected to the housing for allowing access to a display on the electronic device.

6. The secondary enclosure of claim 4 wherein the transparent portion is flexible permitting selective manipulation of a touch screen on the electronic device.

7. The secondary enclosure of claim 3 wherein the first member and the second member are hingedly connected.

8. The secondary enclosure of claim 3 wherein the first member and the second member are secured together by at least one screw.

9. The secondary enclosure of claim 1 further comprising a foam insert in the housing, the foam insert tending to protect the hand held electronic device from an impact.

10. The secondary enclosure of claim 1 wherein the coupling circuitry comprises a first communications port connector to link to the hand held electronic device.

11. The secondary enclosure of claim 10 wherein the connection circuitry cobs a second communications port connector to link to the vehicle diagnostic system.

12. The secondary enclosure of claim 11 wherein the second communication port connector is linked to the vehicle diagnostic system by a cable that has a data link connector configured link to the vehicle diagnostic system.

13. The secondary enclosure of claim 1 further comprising a keypad in circuit communications with at least one of the hand held electronic device and the processor.

14. The secondary enclosure of claim 1 further comprising a memory expansion slot, for receiving a memory expansion card, in circuit communications with the processor.

15. The secondary enclosure of claim 1 wherein the electronic device is a PDA.

16. The secondary enclosure of claim 1 wherein the electronic device is a Pocket PC.

17. An adaptor for facilitating circuit communication between an electronic device and a vehicle diagnostic system comprising:
   an enclosure configured to retain at least a portion of the electronic device, and
   an OBD interface device at least partially housed in the enclosure comprising:
      coupling circuitry capable of establishing communications with the electronic device, and
      connection circuitry capable of establishing communications with a vehicle diagnostic system.

18. The adaptor of claim 17 wherein, the OBD interface device further comprises:
   a first processor in circuit communication with memory, the coupling circuitry, and the connection circuitry.

19. The adaptor of claim 17 wherein the enclosure comprising a transparent portion.

20. The adaptor of claim 17 wherein the enclosure comprises a flexible portion to selectively operate the electronic device without opening the enclosure.

21. The adaptor of claim 17 wherein the connection circuitry is capable of communicating with the vehicle diagnostic system via a cable that has a data link connector for connecting to the vehicle diagnostic system.

22. The ator of claim 17 wherein the coupling circuitry comprises a USB port connector.

23. The adaptor of claim 17 wherein the coupling circuitry comprises an infrared port.

24. The adaptor of claim 17 wherein the enclosure further comprises a keypad in circuit communications with at least one of the processor and the electronic device.

25. The adaptor of claim 17 wherein the enclosure further comprises a memory expansion slot, for receiving a, memory expansion card, in circuit communications with the processor.

26. A protective enclosure for housing an electronic device comprising:
   a housing for removably receiving the electronic device,
   a SBC interface device at least partially enclosed in the housing; the SBC interface device comprising,
      coupling circuitry configured to facilitate communications between the vehicle diagnostic system and the SBC interface device, and
      test circuitry configured to test at least one of a vehicle starter/charging system and a battery,
      wherein the SBC interface device is capable of communicating a result of the test.

27. A device for retrieving information from a vehicle diagnostic system and for testing a starter/charging system comprising:
   a housing for removably receiving an electronic device,
   an interface device at least partially enclosed in the housing capable of communicating with the electronic device and configured to at least one of
      a. facilitate communications with a vehicle diagnostic system,
      b. perform a test on a started/charging system of a vehicle, and
      c. perform a test a battery,
   a connector for releasably receiving a cable,
   the cable configured to couple to one of a vehicle diagnostic system and a starter charger system.

28. A device for retrieving information from a vehicle diagnostic system comprising:
   an electronic device,
   a housing for removably receiving at least a portion of the electronic device, and
   an OBD interface device at least partially enclosed in the housing;
   the OBD interface device comprising,
      coupling circuitry configured to facilitate communications between the hand held electronic device and the OBD interface device, and
      connection circuitry configured to facilitate communications between the vehicle diagnostic system and the OBD interface device.

29. The device of claim 28 wherein the OBD interface device further comprises:
   a processor in circuit communication with the coupling circuitry and the connection circuitry, the processor executing code to facilitate interfacing between the electronic device and the vehicle diagnostic system.

30. The device of claim 28 wherein the housing comprises a transparent portion to permit a display of the electronic device to be seen by a user while the electronic device is at least partially received by the housing.

31. The device of claim 30 wherein the transparent portion is pivotally connected to the first member for allowing access to a display on the electronic device.

32. The device of claim 30 wherein the transparent portion is flexible permitting selective manipulation of a touch screen on the electronic device.

33. The device of claim 28 wherein the coupling circuitry comprises a first communications port connector to link to the electronic device.

34. The device of claim 33 wherein the connection circuitry comprises a second communications port connector to link to the vehicle diagnostic system.

35. The device of claim 34 wherein the second communication port connector is linked to the vehicle diagnostic system by a cable that has a data link connector configured link to the vehicle diagnostic system.

36. The device of claim 29 wherein the housing further comprises an input device in circuit communications with the electronic device to facilitate manipulation of the electronic device when the electronic device is at least partially retained in the housing.

37. The device of claim 29 further comprising a memory expansion slot, for receiving a memory expansion card, in circuit communications with the processor.

38. The device of claim 28 wherein the electronic device comprises a secondary housing.

39. The device of claim 28 wherein the electronic device is a hand held device.

40. The device of claim 28 wherein the electronic device is one of a PDA and a pocket PC.

41. An enclosure for a hand hold electronic device comprising:

a protective housing for protecting the electronic device,     means for at least partially retaining the hand held electronic device, and     means for establishing circuit communication between the hand held electronic device and a vehicle diagnostic system.

42. The enclosure for a hand held electronic device of claim 41 wherein the means for establishing circuit communication between the hand held electronic device and the vehicle diagnostic system comprises logic to generate communications protocol to communicate with the vehicle diagnostic system.

43. The enclosure for a hand held electronic device of claim 41 wherein the means for at least partially retaining the hand held electronic device comprises a connector for receiving the electronic device.

44. The enclosure for a hand held electronic device of claim 41 wherein the means for at least partially retaining the hand held electronic device comprises a foam insert.

45. The enclosure for a hand held electronic device of claim 41 wherein the housing further comprises a keypad in circuit communications with the processor.

46. The enclosure for a hand held electronic device of claim 41 wherein the housing further comprises a memory expansion slot, for receiving a memory expansion card, in circuit communications with the processor.

47. A method of retrieving vehicle diagnostic information comprising:

placing a hand held electronic device in an enclosure that at least partially retains an interface adaptor,     establishing circuit communication between the hand held electronic device and the interface adaptor,     establishing circuit communication between the and held electronic device and a vehicle diagnostic system,     generating a communications protocol to communicate with the vehicle diagnostic system, and     retrieving vehicle diagnostic information from the vehicle diagnostic system.

48. The method of retrieving vehicle diagnostic information of claim 47 further comprising displaying the vehicle diagnostic information on the hand held electronic device.

49. The method of retrieving vehicle diagnostic information of claim 47 wherein establishing circuit communications between the hand held electronic device and the vehicle diagnostic system comprises plugging a connector into the vehicle diagnostic data link connector.

50. The method of retrieving vehicle diagnostic information of claim 47 further comprising downloading the diagnostic information from the hand held electronic device to another device.

51. The method of retrieving vehicle diagnostic information of claim 47 further comprising initiating scan tool functions via a keypad in circuit communications with the processor.

52. The method of retrieving vehicle diagnostic information of claim 47 further comprising uploading programming logic to the interface adaptor via a memory expansion card in circuit communications with the processor.

\* \* \* \* \*